United States Patent [19]

Droux et al.

[11] Patent Number: 4,646,192

[45] Date of Patent: Feb. 24, 1987

[54] MAGNETIC DISC CARTRIDGE HAVING IMPROVED DISC BRAKE

[75] Inventors: Jacques Droux; Albert Langrenne, both of Paris, France

[73] Assignee: CII-Honeywell Bull (Societe Anonyme), France

[21] Appl. No.: 451,596

[22] Filed: Dec. 20, 1982

[30] Foreign Application Priority Data

Dec. 23, 1981 [FR] France .................. 81 24057

[51] Int. Cl.$^4$ ............. G11B 23/03; G11B 5/012; G11B 5/016; B65D 85/30
[52] U.S. Cl. .................. 360/133; 360/97; 360/99; 206/444
[58] Field of Search .............. 206/444, 309; 360/97, 360/98, 86, 103, 133

[56] References Cited

U.S. PATENT DOCUMENTS

| | | | |
|---|---|---|---|
| 3,643,240 | 2/1972 | Raiser | 360/98 |
| 3,786,454 | 6/1974 | Lissner et al. | 360/98 |
| 3,843,967 | 10/1974 | Mulvany | 360/98 |
| 3,855,623 | 12/1974 | Chu et al. | 360/103 |
| 3,864,747 | 2/1975 | Pejcha | 360/98 |
| 4,040,089 | 8/1977 | Guarracini | 360/97 |
| 4,078,246 | 3/1978 | Berthoux et al. | 204/444 |
| 4,252,328 | 2/1981 | Raj et al. | 277/1 |
| 4,320,430 | 3/1982 | Vogt | 360/97 |
| 4,377,830 | 3/1983 | Patel | 360/98 |
| 4,503,474 | 3/1985 | Nigam | 360/97 |
| 4,521,819 | 6/1985 | Elsing et al. | 360/97 |
| 4,532,564 | 7/1985 | Larson et al. | 360/99 |
| 4,550,355 | 10/1985 | Larson et al. | 360/133 |

FOREIGN PATENT DOCUMENTS

| | | | |
|---|---|---|---|
| 0082743 | 6/1983 | European Pat. Off. | 360/97 |
| 54-38141 | 3/1979 | Japan | 360/98 |
| 56-7267 | 1/1981 | Japan | 360/98 |
| 56-105375(A) | 8/1981 | Japan | 360/97 |
| 57-183682(A) | 11/1982 | Japan | 360/98 |

OTHER PUBLICATIONS

Design Ideas (Great Britain), Dec. 1978, p. 13, no author, "Ferromagnetic Fluid Sealing Protects Computer Information".
IBM Technical Disclosure Bulletin, vol. 20, No. 10, Mar. 1978, pp. 4104-4105, "Removable Media Disk File" by Fugate et al.

Primary Examiner—John H. Wolff
Assistant Examiner—Alfonso Garcia
Attorney, Agent, or Firm—Lowe, Price, Leblanc, Becker & Shur

[57] ABSTRACT

A disc of a magnetic disc cartridge is braked while the cartridge is outside of a receptacle of a magnetic disc memory unit by a radially extending leaf spring mounted on a wall of the cartridge so it has a free end engaging an aperture in a drive platter. The drive platter has an aperture that is engaged by a drive post of a drive disc connected to the memory drive shaft while the cartridge is inserted in the receptacle. The leaf spring is positioned so that the free end thereof is lifted out of the aperture by a post fixedly mounted on the memory unit to release the brake member while the cartridge is in place in the receptacle.

23 Claims, 9 Drawing Figures

FIG. 1

FIG. 2  PRIOR ART          AT REST

FIG. 3  PRIOR ART          IN SERVICE

MAGNETIC DISC CARTRIDGE HAVING IMPROVED DISC BRAKE

TECHNICAL FIELD

The present invention relates generally to magnetic disc memory cartridges and more particularly to a magnetic disc cartridge having a pair of spaced bearings for supporting a drive coupling between a drive shaft of a disc memory and a hub carrying a disc within the cartridge.

BACKGROUND ART

Magnetic disc memory units are widely used in data processing systems because such units have high storage capacity and require relatively short time for read/write heads of a disc memory to access data stored at a given point on the disc in response to a disc memory address supplied to the memory unit. Magnetic discs employed in disc memory units carry data on circular concentric tracks, typically positioned on both sides of the disc. The tracks generally have a width of no more than a few dozen microns. To transduce, i.e., read and write, data on the disc, magnetic heads of the memory units are positioned adjacent opposite faces of the disc, at a distance of a few tenths of a micron.

The mangnetic discs are rotatably driven by an electric motor of the disc memory unit at a constant rotational speed. Current memory units frequently include a limited number of discs, i.e., one or two discs, and have a relatively limited storage capacity, on the order of ten to several tens of millions of bytes. Each byte typically includes eight bits, i.e., a binary digit data unit having a value equal to one or zero, as indicated by a magnetic flux transition on a track of the disc. Typically, at least one disc is enclosed in a cartridge that is selectively inserted into and removed from a receptacle of the magnetic disc memory unit. A disc memory unit receptacle normally contains only a single removable cartridge. When a cartridge is removed from the receptacle, another cartridge is immediately inserted into the receptacle as soon as read and/or write operations have been completed on the disc in the initially inserted cartridge. Thus, plural removable cartridges, each containing at least one magnetic disc, are used with a single disc memory unit.

Certain disc memory units contain two magnetic discs, one of which is fixed and remains permanently inside the disc memory unit; the other disc is contained in a cartridge that is selectively inserted and removed from the disc memory unit receptacle.

Cartridges containing removable magnetic discs have standarized shapes and dimensions, enabling them to be used interchangeably with magnetic disc units of different manufacturers. Thereby, the standarized cartridges are easily inserted into and removed from the receptacles of many different magnetic disc memory units. The cartridges are constructed to protect discs located therein from contamination by dust and other particulate matter during periods while the cartridges are not in use, i.e., while a particular cartridge is not inserted into a magnetic disc memory unit receptacle. The prior art cartridges typically include structure for ventilating the disc while the cartridge is inserted into the disc memory unit receptacle, thereby to insure that the disc remains extremely clean, to increase reliability of data read from the disc. Exemplary of such a cartridge which is selectively inserted into and removed from a receptacle of a magnetic disc memory unit is disclosed in French Patent No. 2,337,396, corresponding to U.S. Pat. No. 4,078,246, commonly owned with the present invention, and entitled "Container For A Magnetic Disc".

The cartridge disclosed in the French patent contains a rigid disc having a relatively small diameter. The cartridge is relatively flat, having a height less than one tenth the length or width thereof. The cartridge is inserted into a suitable disc memory unit receptacle. The cartridge includes a side wall having an opening which is normally closed while the cartridge is not in use, i.e., when the cartridge is not in the disc memory unit receptacle. When the cartridge is inserted into the disc memory unit receptacle, magnetic read/write heads of the unit extend through the opening and are moveable relative to recording tracks on the disc. The cartridge includes a mechanism for coupling a hub carrying the disc to a rotary drive mechanism, usually an electric motor, of the disc memory unit.

The cartridge includes rigid, elastically deformable, opposed, generally parallel walls having a tendency to be outwardly convex in a free state. At the center of one of the parallel walls is provided an internal projection, forming an annular bearing surface facing an inside face of the one wall. The other wall includes an opening coaxial with the center of the one wall. The opening in the other wall is surrounded by an annular bearing surface on the outside face of the other wall. The disc is carried by an annular hub having internal and external flanges positioned to engage the bearing surfaces of the other wall. The axial spacing between the flanges is less than the spacing between the bearing surfaces of the other wall while the other wall is in the free state, whereby when the disc is in an idle state and the parallel walls are flattened an elastic restoring force mechanically holds the disc in proper position. When the cartridge is inserted into the receptacle of the magnetic disc memory and the disc is being driven, the disc is able to turn because the walls are urged toward each other, with a concave configuration. The bearing surfaces and flanges are constructed so that the cartridge is sealed when not in use, thereby protecting the hub carrying the disc and the disc from dust particles. By selecting suitable relative positions and diameters for the flanges, the disc is automatically ventilated during operation in response to a centrifugal effect of air on opposite faces of the disc, to provide cleaning of dust and other particulate matter from the disc surface, as well as cooling.

As disclosed, for example, in commonly owned U.S. Pat. No. 4,298,898 written onto discs enclosed in removable cartridges are separated into adjacent, circular, equal sized segments, with each side or face of the disc being normally divided into several dozen segments. Each segment is divided into two portions of different sizes, such that the larger portion contains data processed or to be processed by a data processing system including the disc memory unit containing the cartridge. The smaller portion contains track identification data used by the data processing system for positioning the read/write magnetic heads of the memory unit relative to the disc tracks. Within each segment, the smaller portion is separated into a number of reference areas. The number of reference areas is equal to the number of tracks, such that each track is associated with a single, separate area. The number of data bits per unit length along the circumference of a disc track is referred to as "longitudinal data density", while "radial density" indicates the number of tracks per unit length measured along the disc diameter.

The current trend in developing magnetic discs is focused particularly on obtaining substantial increases in radial and longitudinal densities. Typically, radial densities are on the order of 150 to 400 tracks per centimeter, i.e., 850 to 1,000 tracks per inch (TPI), while the longitudinal densities are on the order of 2,000 bits per centimer, i.e., 5,000 bits per inch (bpi).

It is difficult to obtain the same longitudinal and radial densities on removable magnetic discs enclosed in cartridges as on a disc which remains fixed permanently inside a disc memory unit. The removable feature of such cartridge enclosed magnetic discs is a limiting factor on the longitudinal and radial densities thereof. Different discs have differing mechanical dispersions, such that each disc has a different warp. In addition, different discs are located at slightly different center points within each cartridge relative to an axis of a drive motor. Thereby, variations subsist in the position of a disc track and face below magnetic heads of the disc memory unit. These variations are reflected in the amplitude of the electric signal derived by the read/write heads during a read operation, and can result in an error of a detected binary bit.

An additional limiting factor on the potential for obtaining high radial track densities, i.e., TPI, is that a coupling between a hub carrying the disc and a drive motor spindle of the disc memory unit may cause a particular track to be out of round. If a particular track is out of round, disturbances exist while track identification data are written into the reference areas and during read operations. The out of round track position results from assembly tolerances between the disc hub and the drive motor axis. The out of round position problem is further exacerbated by foreign particulate matter lodging in the various couplings between the cartridge and drive motor spindle.

To obtain the same high densities, in both the longitudinal and radial directions, for removable discs as is obtained for fixed discs, it is necessary to provide improved mechanical coupling tolerances between the disc tracks and unit heads, particularly by minimizing the out of round track positioning tolerances. It is desired to reduce the out of round track positioning tolerance to three to four microns, an improvement which is costly and difficult to obtain with the prior art cartridges, such as described in U.S. Pat. No. 4,078,246.

It is therefore an object of the present invention to provide a magnetic disc cartridge having improved mechanical coupling tolerances between the magnetic disc in the cartridge and magnetic head means of magnetic disc memory unit.

Another object of the present invention is to provide a new and improved cartridge for at least one removable magnetic disc wherein out of round track positions caused by assembly tolerances between a hub carrying the disc and a drive motor axis for the hub is minimized.

An additional object of the invention is to provide a new and improved cartridge for at least one removable magnetic disc wherein the tendency for foreign particulate matter to lodge in various couplings between the cartridge and a drive motor spindle of a magnetic disc memory unit is minimized, thereby reducing out of round positioning between tracks of the disc and magnetic heads of the magnetic disc memory unit.

The out of round condition has a tendency to exist in prior art cartridges containing removable magnetic discs because the disc axis of rotation is independent of the cartridge containing the disc. Instead, the disc axis of rotation is determined by the axis of the drive motor. Because the cartridge is not invariably located at the same position within the memory unit receptacle each time, there is a shift in the disc position, thereby tending to increase the out of round condition between a disc track and disc memory unit head.

DISCLOSURE OF INVENTION

In the magnetic disc cartridge according to the present invention, tolerances between a coupling of a hub carrying the disc and a drive axis for the memory unit motor are optimized by installing bearings, such as ball bearings, in the cartridge. The bearings in the cartridge determine the axis of rotation of the magnetic disc. There is precise rotation of the disc about the axis of the cartridge, with precise positioning of the magnetic disc axis of rotation to within three to four microns. Thereby, high rotational precision of the disc tracks relative to the memory unit heads is provided when the cartridge is used during read operations, as well as when track identification data are written onto the disc. This high precision occurs because the same axis of rotation, based on an axis of the cartridge, is employed during both the read and write operations. In contrast in conventional cartridges drive shaft axes determine the track axis of rotation so the disc tends to turn about different centers, whereby there is a tendency for the tracks to occupy different positions during the read and write operations.

According to one aspect of the invention, a cartridge carrying at least one removable magnetic disc and designed to be inserted into a suitable receptacle of a magnetic disc memory unit having a disc rotary drive mechanism includes a shell, inside of which the disc is positioned. The shell includes an opening through which read/write heads for accessing data stored on the disc are introduced. The opening is closed when the cartridge is not in use. A hub carrying the disc is coupled to the rotary drive mechanism of the memory unit by a mechanism including plural speed bearings mounted on the shell. The bearings support a drive coupling means between the memory unit drive shaft and the hub. The bearings have an axis of symmetry determining the disc axis of rotation.

According to a further aspect of the invention an improved magnetic disc cartridge adapted to be selectively inserted into a receptacle of a magnetic disc memory unit having head means for transducing magnetic data of a disc in the cartridge includes a disc drive shaft. The cartridge includes a shell within which the disc is mounted. The shell has first and second end walls generally parallel to each other and faces of the disc, as well as a side wall including a normally closed opening through which the head means is inserted while the cartridge is inserted into the receptacle. The drive shaft is coupled to the disc so the disc is turned by the drive shaft while the cartridge is inserted into the receptacle. A coupling between the drive shaft and disc includes a hub for carrying the disc. The hub is mounted in proximity to the second wall and has an axis of rotation at right angles to the parallel walls. The hub carries the disc so that the disc is coaxial with the axis. A drive connection for the hub extends through the first wall to the drive shaft. The first wall includes an annular segment extending coaxially with the axis toward the second wall. First and second spaced bearings for the drive connection are mounted coaxially with the axis and carried within and on opposite ends of the annular segment to precisely position the disc relative to the head means while the cartridge is in the receptacle and the disc is being turned by the drive shaft. Because the bearings are spaced longitudinally along the axis the hub and disc are always concentric with the axis, the tracks on the disc are concentric to the axis within three to four microns. Thereby, inserting the cartridge into different receptacles of different disc memory units does not result in relative displacement between the tracks and a center drive axis therefor, to minimize the out of round tendency for the different tracks. Displacement between the memory unit drive shaft and the tracks is of no consequence because the read/write heads of the memory unit are positioned in response to address data carried on the disc tracks.

In accordance with a further aspect of the invention there is provided a magnetic disc cartridge adapted to be selectively inserted into a receptacle of a magnetic disc memory unit. The unit has head means for transducing magnetic data of a disc of the cartridge and a disc drive shaft. The cartridge includes a shell within which the disc is mounted. The shell has first and second end walls generally parallel to each other and faces of the disc, as well as a side wall including an opening. A door closes the opening while the cartridge is not in the memory unit. The door is opened and the head means is inserted through the opening while the cartridge is inserted in the receptacle. The drive shaft is coupled to the disc so the disc is turned by the drive shaft while the cartridge is inserted in the receptacle. A drive platter mounted in proximity to the second wall coaxially with the axis has an aperture adapted to be engaged by a drive post of a drive disc connected to the memory drive shaft while the cartridge is inserted in the receptacle. The drive platter carries a drive connection for the disc and is connected to a bearing adjacent the second wall. Brake means normally engaging the drive platter prevents turning of the drive platter and the disc. The brake means is released while the cartridge is in the receptacle and includes a radially extending leaf spring mounted on the first wall so it has a free end engaging another aperture in the drive platter while the cartridge is outside the disc memory unit. The leaf spring is positioned so the free end thereof is lifted out of the another aperture by another post fixedly mounted on the memory unit to release the brake means while the cartridge is in place in the receptacle.

The above and still further objects, features and advantages of the present invention will become apparent upon consideration of the following detailed description of several specific embodiments thereof, especially when taken in conjunction with the accompanying drawings.

DETAILED DESCRIPTION OF FIGS. 1-3

Figure 1:
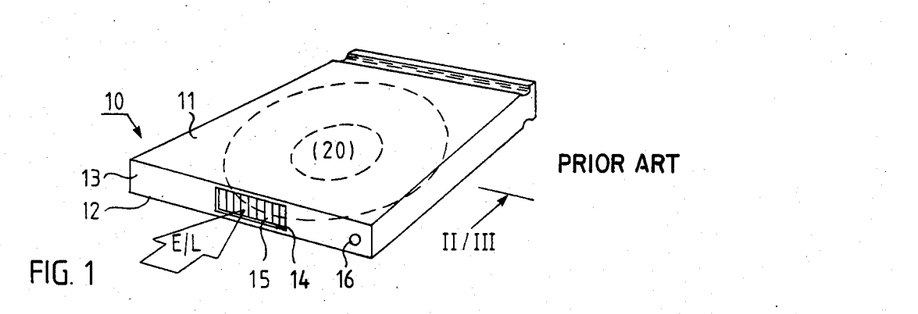
FIG. 1 is a perspective view of the exterior of a prior art cartridge.
Figure 2:
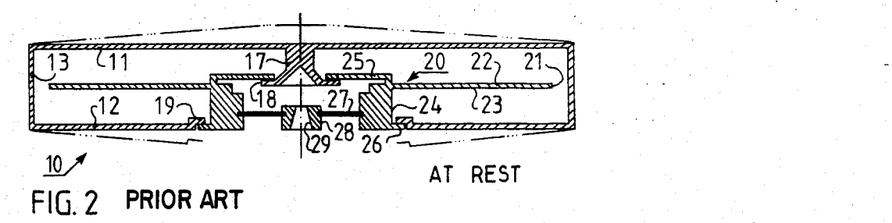
FIGS. 2 and 3 are cross-sectional views of the prior art cartridge illustrated in FIG. 1 while the cartridge is respectfully at rest and in service.
Figure 3:
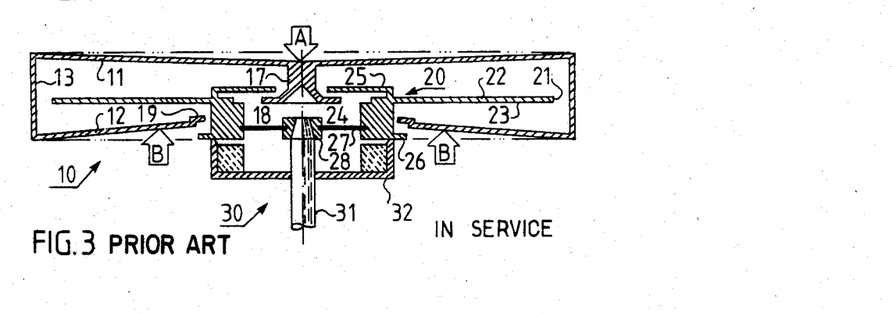

To provide a better understanding of the principles of assembly and operation of the cartridge carrying removable magnetic discs according to the present invention, the prior art configuration illustrated in FIGS. 1-3 is considered. The cartridge illustrated in FIGS. 1-3 is of the type disclosed and illustrated in U.S. Pat. No. 4,078,246.

As illustrated in FIG. 1, magnetic disc 20 is enclosed in cartridge 10, configured as a relatively flat box having square top and bottom walls 11 and 12. One side wall 13 of cartridge 10 includes aperture 14, normally closed by shutter 15 when the cartridge is not being used, i.e., when the cartridge is not inserted into a disc memory unit receptacle. Shutter 15 is operated by a known tamper proof internal mechanism, to insure that the aperture is not obstructed while the cartridge is inserted in the magnetic disc memory unit receptacle. Immediately after shutter 15 is opened, magnetic read/write heads E/L, represented by an arrow in FIG. 1, are introduced into cartridge 10 to read data stored on both sides of magnetic disc 20. Cartridge 10 is formed by an assembly of parts made of a rigid, but elastically deformable material.

In FIG. 2, cartridge 10 is illustrated as being in an idle or rest state, outside of a magnetic disc memory unit, between successive operating periods. In FIG. 2, upper wall 11 is illustrated as including a center, internal projection 17, terminating with an external extractor ring flange 18, forming an annular bearing surface generally parallel to walls 11 and 12 within cartridge 10. Wall 12 includes an opening coaxial with projection 17. The edge of the opening in wall 12 is defined by annular bearing surface 19.

Disc 20 is a flat annular body 21 having flat parallel faces 22 and 23, both covered with a magnetic recording coding. Disc 20 includes annular hub 24 having axially spaced and opposed extremities in the interior and exterior of the volume between walls 11-13. The extremity of hub 24 within walls 11-13 carries an inwardly extending flange 25 that engages the top face of flange 18. The external extremity of hub 24 includes outwardly extending flange 26, having a top surface which engages the bottom face of flange 19 surrounding the opening in wall 12. Hub 24 includes an internal axial passage fitted with diaphragm 27, which is either star shaped or perforated to enable gas to pass through it. Diaphragm 27 carries centering ring 28 having a frustoconical socket or tapered hole 29.

Opposing end walls 11 and 12 of cartridge 10 are maintained substantially planar and parallel to each other, as shown by the solid lines in FIG. 2 while the cartridge is at rest, i.e., not in use. The elastic nature of walls 11 and 12, however, tends to cause the walls to be flexed outwardly, to assume a convex shape, as shown by the dotted lines in FIG. 2. There is therefore an elastic restoring force exerted on walls 11 and 12 to maintain discs 20 in place while the cartridge is in an idle or storage period. Thereby, an air tight seal is provided where flanges 25 and 26 meet bearing surfaces 18 and 19.

In FIG. 3 the position of disc 20 inside of cartridge 10 is illustrated, assuming that the cartridge is in situ within a receptacle of a magnetic disc memory unit. In response to cartridge 10 being loaded into the receptacle, walls 11 and 12 are deflected into a concave condition, so that the walls move closer to each other, as indicated by the solid line positions of walls 11 and 12. The relative movement of walls 11 and 12 between the rest and service conditions is indicated in FIG. 3 by comparing the dotted line positions of the walls, as subsists when the cartridge is not in use, and the solid line positions. Because walls 11 and 12 are deflected inwardly when cartridge 10 is in the receptacle flanges 25 and 26 of hub 20 are disengaged from bearing surfaces 18 and 19 of cartridge 10, to enable the disc to be rotated, cleaned and ventilated while it is driven by motor assembly 30 of the disc memory unit. Disc 20 and hub 24 which carries it are driven by a motor, preferably an electric motor, of the disc memory unit. The motor is coupled to spindle 31 having a tapered head which fits into tapered hole 29 of centering ring 28. Fixedly mounted on spindle 31 is platter 32, having a longitudinally extending flange with an edge for engaging the bottom face of flange 26 of hub 24. Platter 32 is perforated and magnetically coupled between hub 24 and spindle 31.

The axis of rotation of disc 20 is determined by the axis of rotation of the drive mechanism of the disc memory unit, i.e., the longitudinal axis of spindle 31. Thereby, the axis of rotation of tracks included on magnetic disc 20 while track identification data are written into reference areas of each track in the several segments of the disc by a special disc memory formatter is determined by the axis of symmetry of drive spindle 31 of the formatter. However, the axis of rotation of disc 20 during read operations is determined by the axis of symmetry of drive spindle 31 of the disc memory unit into which cartridge 10 is inserted. Because of the mechanical tolerances of drive spindle 31 of the disc memory unit performing a read operation and the disc memory formatting unit, as well as the tolerances of centering ring 28 with respect to tapered hole 29, the disc axis of rotation during the write, formatting operation has a tendency not to coincide with the axis of rotation of the disc during read operations. The displacement of the tracks during the read and write operations can be as great as several microns, a distance corresponding to the tolerances of tracks on disc 20. When radial densities on the order of several hundreds of tracks per centimeter are desired, the data width is on the order of the distance between the axis of rotation of the disc during the read and write operations. Thereby, errors may occur in reading track identification data, which result in errors in the position of the magnetic heads relative to the disc track rate of position.

DETAILED DESCRIPTION OF PREFERRED EMBODIMENT

Cartridge CART according to the present invention, as illustrated in FIGS. 4–8, obviates these disadvantages. Cartridge CART includes magnetic disc DISC, carried by hub MOY. Cartridge CART includes aperture F through which magnetic read/write heads 175 and 176, carried by supporting arms (not shown) of the magnetic disc memory unit or formatter are inserted into the cartridge while the cartridge is in a receptacle of the disc memory unit or formatter.

Cartridge CART includes an arcuate shutter, i.e., door, RF which slides inside of track CART to close aperture F, i.e., to provide a normally closed opening. Shutter RF is integral with coil return-spring SPG, mounted on a hub of gear wheel CREM, in turn positioned on post 146, FIGS. 4 and 6. Cartridge CART is formed by two complementary shell halves $ENV_1$ and $ENV_2$ having square, generally parallel end walls and flanges which are secured to each other to form a complete shell ENV. Shell halves $ENV_1$ and $ENV_2$ are preferably made of a relatively rigid plastic material. One side wall of envelope ENV includes aperture F.

Figure 4:
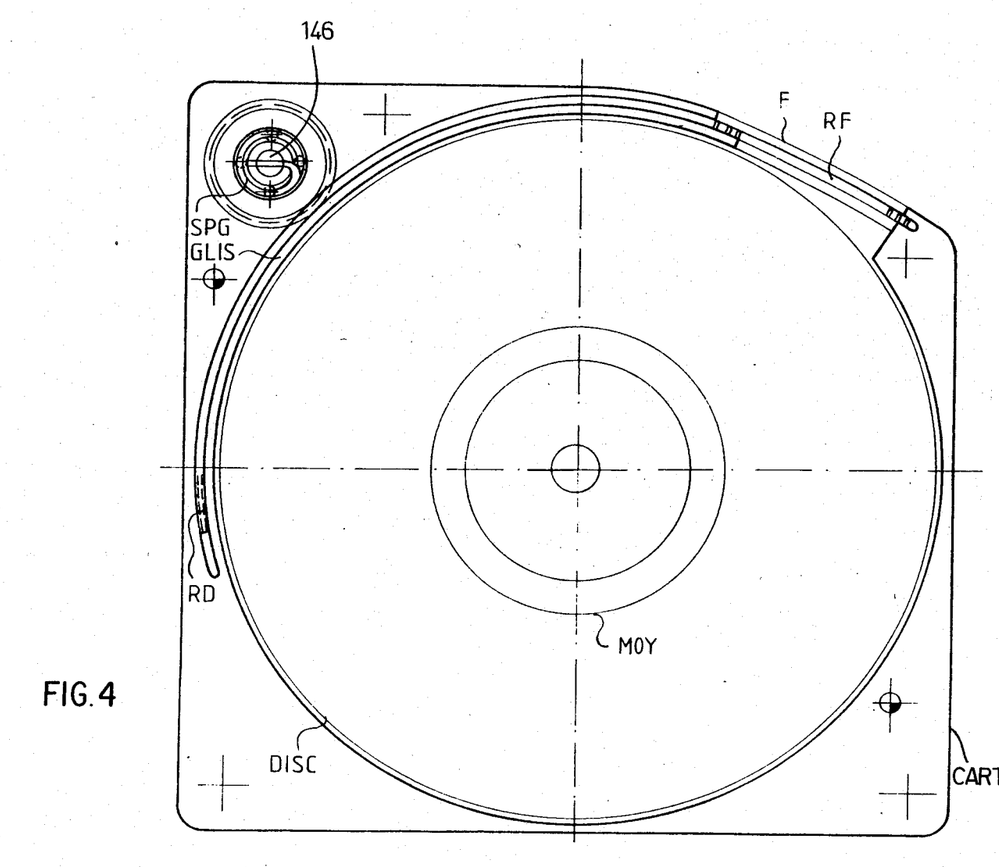
FIG. 4 is a cross-sectional view of a magnetic disc cartridge in accordance with one embodiment of the present invention.

The planar face of envelope $ENV_2$ includes an inwardly extending center portion for carrying a drive mechanism for disc DISC to assure that tracks on the disc are always fixedly positioned with respect to central axis $AX_r$ of envelope ENV, even though cartridge CART is inserted into receptacles of different disc drive memory units. The drive mechanism of envelope ENV is mounted on annular extension 116 of shell half $ENV_2$. Annular extension 116 extends longitudinally of axis $AX_r$ and is connected to the planar end wall of shell half $ENV_2$ by relatively wide, stepped flanges 142 and 181. Annular extension 116 thus includes opposed longitudinally displaced end faces 183 and 184, respectively positioned in proximity to the parallel end walls of shell halves $ENV_1$ and $ENV_2$. Bearings $ROUL_1$ and $ROUL_2$ are preferably precision ball bearings of the type manufactured, for example, by the French company A. D. R. (A subsidiary of S. K. F.); the ball bearings are preferably of the type employed in gyroscopes. Bearings $ROUL_1$ and $ROUL_2$ are held in situ by the cylindrical wall of an annular extension, i.e., annular wall segment, 116, in proximity to end walls 183 and 184, respectively. Bearings $ROUL_1$ and $ROUL_2$ support drive shaft 180 which extends between and is connected to drive platter PLE and hub MOY which carries disc DISC. Set screw VISFP holds one end of drive shaft 180 in situ on cartridge axis $AX_r$ at the end wall of half shell $ENV_2$ while the other end of the shaft is threaded into a threaded bore on axis $AX_r$ at circular face 186 of hub MOY. Thereby, the longitudinal axis of shaft 180 and set screw VISFD and the axis of rotation of hub MOY and disc DISC coincide with axis $AX_r$.

Figure 7:
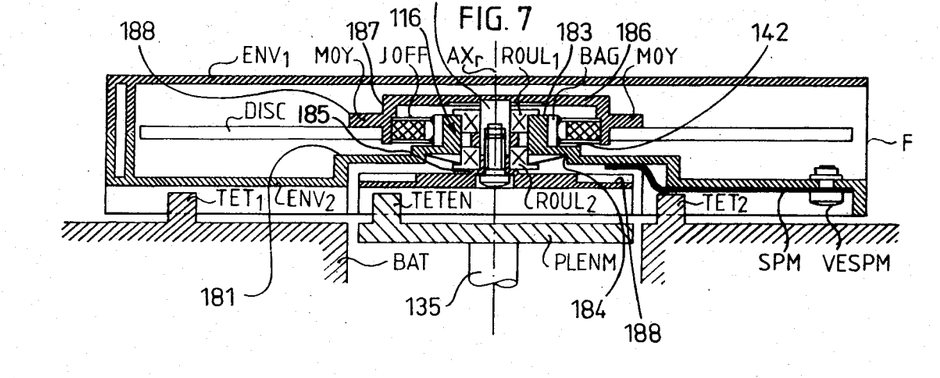
FIG. 7 is a side cross-sectional view of the cartridge illustrated in FIG. 4, when the cartridge is in use, positioned in a magnetic disc memory unit.
Figure 8:
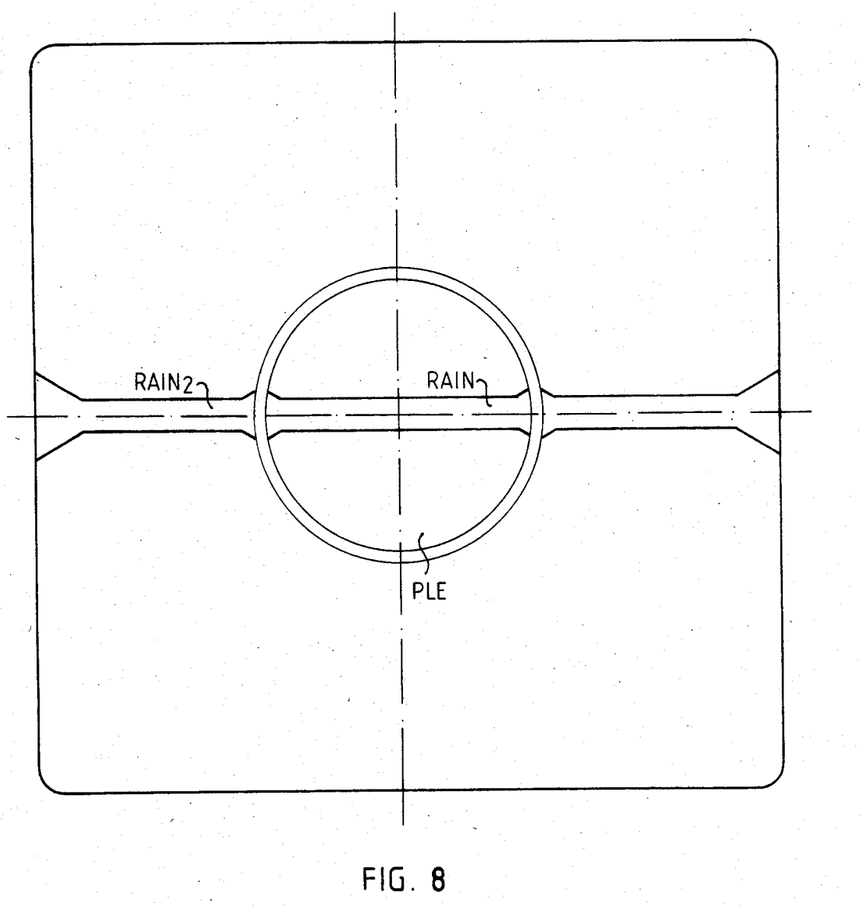
FIG. 8 is a view of the cartridge illustrated in FIG. 4, taken from a face engaging the magnetic memory unit.

Platter PLE includes a radially extending slot RAIN, FIG. 8, connected to post TETEN of drive platter PLENM of the disc memory unit when cartridge CART is inserted into a receptacle of the disc memory unit, as illustrated in FIG. 7. Post TETEN is covered with a flexible plastic sleeve, which slides tightly on the post while the post is held tightly in place in slot or groove RAIN, thereby to avoid mechanical play in the coupling between platters PLENM and PLE. Platter PLENM is fixedly connected to drive shaft 135 of the disc memory unit, which drive shaft is preferably turned by an electric motor of the disc memory unit and is nominally coincident with axis $AX_r$.

Bearings $ROUL_1$ and $ROUL_2$ are held in situ between the internal wall of annular extension 116 and the periphery of shaft 180. The bottom face of bearing $ROUL_2$ bears against an upwardly extending ring segment 185 of platter PLE. Bearings $ROUL_1$ and $ROUL_2$ include radially extending lips on one end thereof. The radially extending lip of bearing $ROUL_1$ rests on face 183 of annular extension 116. The lip of bearing $ROUL_2$ is held in situ by one face of lock washer ROND, another face of which bears against face 184 of annular extension 116. Bearings $ROUL_1$ and $ROUL_2$ are longitudinally spaced from each other by cross piece or spacer ENTO, formed as a ring concentric with axis $AX_r$.

Hub MOY is a symmetric, generally circular element having a center of rotation coincident with axis $AX_4$. Circular, planar face 186 of hub MOY is generally parallel to the planar faces of shell halves $ENV_1$ and $ENV_2$; face 186 is adjacent the planar end wall of shell half $ENV_1$. Extending from the edge of face 186, away from the planar end wall of shelf half $ENV_1$, toward the planar end wall of shell half $ENV_2$ is cylindrical wall 187 which carries an outwardly extending flange 188. Disc DISC is held in situ between the face of flange 188 facing shell half $ENV_2$ and the exterior wall of cylinder 187.

Bearings $ROUL_1$ and $ROUL_2$ are likely to carry particles having a tendency to migrate toward disc DISC while cartridge CART is in the receptacle of the disc memory unit. To isolate the space or volume where disc DISC is located from the volume where bearings $ROUL_1$ and $ROUL_2$ are located, thereby to substantially prevent the particles of the bearings from reaching the disc, a seal is provided between the bearing space and the disc space. The seal includes ferrofluidic joint JOFF, preferably of a type manufactured by the United States company Ferrofluidic Incorporated. Joint JOFF is configured as a ring, having an external edge bearing against the internal surface of flange 187 of hub MOY. Ferrofluidic joint JOFF has an internal edge bearing against the periphery of washer BAG, having an internal surface bearing against the outer wall of annular extension 116. Ferrofluidic joint JOFF prevents dust particles emitted by bearings $ROUL_1$ and $ROUL_2$, for example dust from bearing lubricants, from contaminating the space where disc DISC is located; the dust particles are confined to space ESP, between the ferrofluidic joint and wall 186 of hub MOY.

While cartridge CART is not inserted into a receptacle of a disc memory unit, platter PLE, shaft VISFP, hub MOY, and disc DISC are braked. To this end, the top face of platter PLE includes radially extending indentation 188 for receiving leaf spring SPM. Leaf spring SPM is connected by screw assembly VESPM to shell half $ENV_2$ so that the leaf spring extends along the planar wall of shell half $ENV_2$, in alignment with radially extending slot $RAIN_2$ in the wall. One end of leaf spring SPM is held in situ at the periphery of shell half $ENV_2$ by screw and bolt assembly VESPM; the other end of the leaf spring engages one of indentations 188 while cartridge CART is not in the receptacle.

Figure 5:
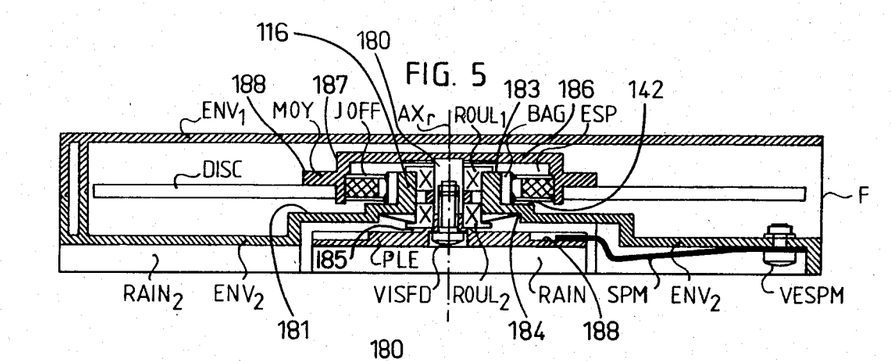
FIG. 5 is a side sectional view of the cartridge illustrated in FIG. 4, indicating the relative position of the members comprising the cartridge when the cartridge is not in use.
Figure 6:
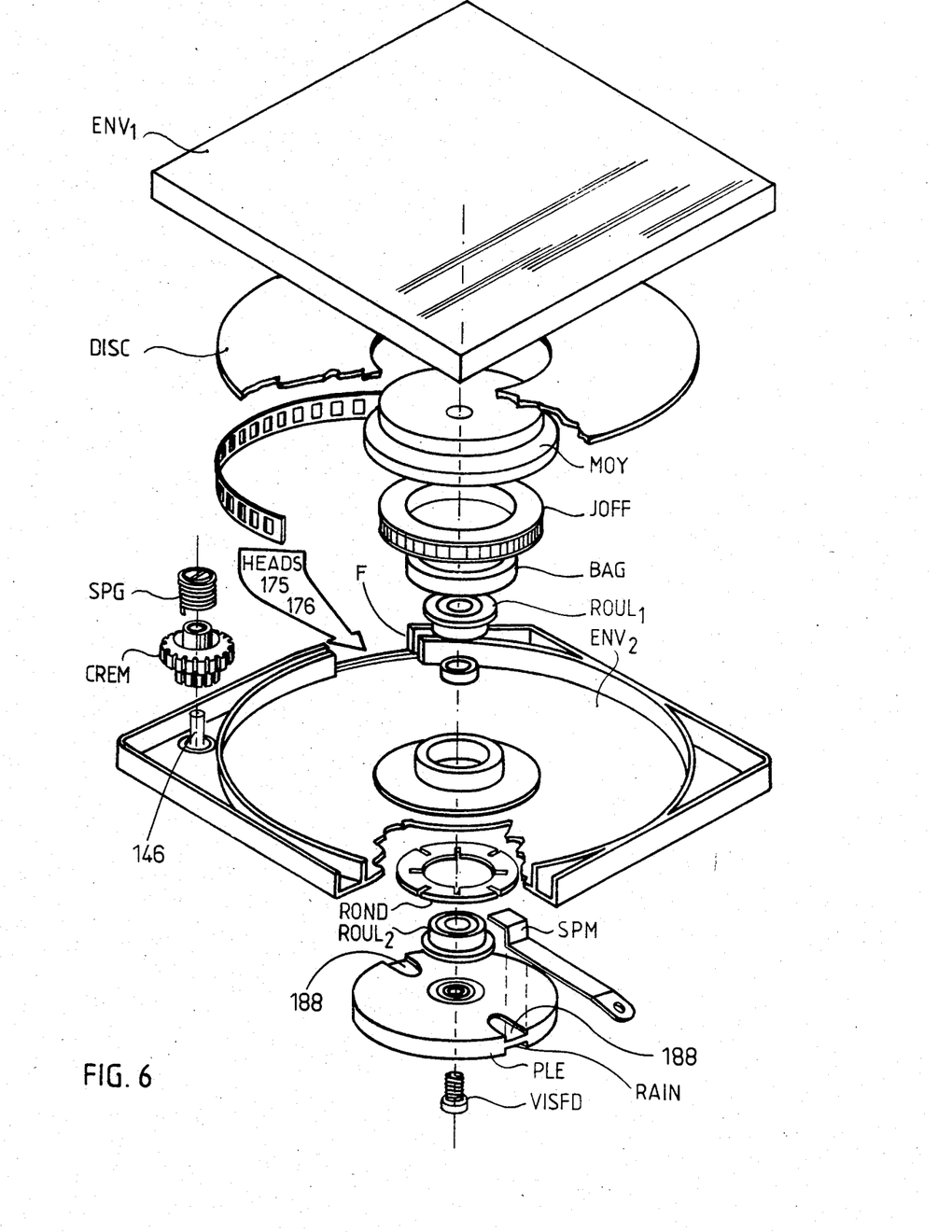
FIG. 6 is an exploded, perspective view of the cartridge illustrated in FIGS. 4 and 5 (the perspective view of FIG. 6 is not completely accurate because certain parts have been relocated for ease of presentation)

In the brake position illustrated in FIG. 5, grooves $RAIN_2$ and RAIN are aligned and have the same width and length. Pegs, i.e., posts $TET_1$ and $TET_2$ are cylindrical and have substantially the same diameter as the width of slot or groove $RAIN_2$. Peg $TET_2$ presses spring SPM against the exterior end wall of half shell $ENV_2$ in such a way that the spring releases drive platter PLE from the braked condition, to enable the platter to rotate.

When cartridge CART is inserted into the disc memory unit receptacle, shutter RF closing aperture F, is open by means of a known fixed part of the disc memory unit, integral to frame BAT of the unit. The fixed part of frame BAT acts on gear wheel CREM and therefore on coil spring SPG to open shutter RF to the position illustrated by dotted lines in FIG. 4. The magnetic read and write heads 175 and 176 are then inserted into cartridge CART. An advantage of the invention is the symplicity with which the cartridge is inserted into the disc memory unit receptacle, as only a single insertion operation is required.

With cartridge CART inserted into the receptacle of the disc memory unit, radially extending slots $RAIN_2$ in shell half $ENV_2$ are located so that guide pegs $TET_1$ and $TET_2$ on frame BAT of the disc memory unit protrude into the cartridge via slots $RAIN_2$. Pegs $TET_1$ and $TET_2$ are radially displaced from each other relative to axis $AX_r$ so the latter is closer to the axis than the former. Pegs $TET_1$ and $TET_2$ engage slots $RAIN_2$ to hold cartridge CART in situ. In addition, peg $TET_2$ engages spring SPM to urge the spring upwardly, out of indentation 188.

The braking mechanism for disc DISC is thereby released so the disc can be turned in response to turning of drive shaft 135 of the disc memory unit. Shaft 135 turns drive platter PLENM, which in turn rotates drive platter PLE; drive platters PLENM and PLE are part of a drive connection between shaft 135 and hub MOY. Rotation of drive platter PLE results in turning of shaft 180, hub MOY and disc DISC. Because the axis of rotation of shaft 180 is fixed by bearings $ROUL_1$ and $ROUL_2$, disc DISC is rotated with great precision about axis $AX_r$ regardless of the receptacle into which cartridge CART is inserted. The elasticity of the parallel walls of shell half $ENV_1$ and $ENV_2$ offsets mechanical play of bearings $ROUL_1$ and $ROUL_2$.

While bearings $ROUL_1$ and $ROUL_2$ are illustrated in the embodiment of FIGS. 4–8 as being located and carried exclusively by shell half $ENV_2$, it is to be understood that the invention can be modified so that shell halves $ENV_1$ and $ENV_2$ respectively carry bearings $ROUL_1$ and $ROUL_2$.

Cartridge CART also preferably includes a ventilation device for ventilating and cleaning dust and foreign particles that enter the cartridge from disc DISC. The ventilation device is preferably of a type disclosed in French application Ser. No. 8,124,061, filed Dec. 23, 1981, commonly owned with the present invention, and entitled Ventilated Cartridge for Removable Magnetic Disc.

Figure 9:
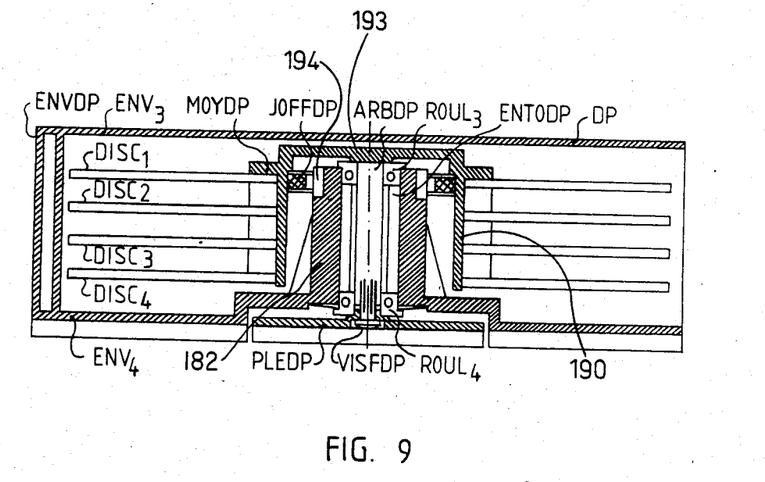
FIG. 9 is a cross-sectional view of a second embodiment of a cartridge of the invention, wherein four removable magnetic discs are included.

Reference is now made to FIG. 9 of the drawing, a second embodiment of cartridge ENVDP containing four coaxial discs $DISC_1$, $DISC_2$, $DISC_3$ and $DISC_4$. Cartridge ENVDP includes two half shells $ENV_3$ and $ENV_4$, generally configured similar to half shells $ENV_1$ and $ENV_2$ in the embodiment of FIGS. 4–8, except that the height of the side walls of half shells $ENV_3$ and $ENV_4$ is greater than the height of the side walls of half shells $ENV_1$ and $ENV_2$, to enable cartridge ENVDP to accommodate the four coaxial discs.

The inner edges of discs $DISC_1$, $DISC_2$, $DISC_3$, and $DISC_4$ are mounted on the outer edge of downwardly depending cylinder 190 of hub MOYDP, whereby all four of the discs are concentric with each other and the longitudinal axis of shaft ARBDP, on which the hub is mounted so that the axes of the hub and shaft are coincident. Discs $DISC_1$, $DISC_2$, $DISC_3$ and $DISC_4$ are longitudinally spaced along cylinder 190 and are fixed in place since the discs abut against opposite faces of annular spacers 181, having inner peripheries abutting against the outer periphery of cylinder 190. One end of shaft ARBDP is secured to hub MOYDP by a threaded fixed connection between them. Opposite peripheral ends of shaft ARBDP are held in situ by longitudinally spaced bearings $ROUL_3$ and $ROUL_4$, between which are located spacers ENTODP. Bearings $ROUL_3$ and $ROUL_4$ are carried by annular segment 182 of shell half $ENV_4$. The end of shaft ARBDP opposite from hub MOYDP is held in place by bolt VISFDP, having a head bearing against a lip of drive platter PLEDP, so that the drive platter is an integral part of shell half $ENV_4$ when the assembly is completed. Bearings $ROUL_3$ and $ROUL_4$ are held in situ by an assembly identical to that described in connection with FIGS. 4–8, whereby the description of the mechanism for holding the bearings in place need not be repeated. Drive platter PLEDP is driven by the drive platter of the magnetic disc memory unit in the same manner as drive platter PLE in the embodiment of FIGS. 4–8. Spacer ENTODP limits internal mechanical play between bearings $ROUL_3$ and $ROUL_4$.

Annular ferrofluidic joint JOFFDP has an outer periphery bearing against the internal wall of cylinder 190, in proximity to end wall 193 of hub MOYDP; end wall 193 is adjacent and parallel to a planar wall of half shell $ENV_3$. The inner periphery of joint JOFFDP bears against washer 194 on the end of annular segment $ENV_3$ remote from the planar end wall of half shell $ENV_4$. Thereby, ferrofluidic joint JOFFDP isolates discs 173–176 from particles which may be given off by bearings $ROUL_3$ and $ROUL_4$, to prevent contamination of the disc.

In the embodiment of FIG. 9, bearings $ROUL_3$ and $ROUL_4$ are respectively located in half shells $ENV_3$ and $ENV_4$. It is to be understood, however, that in a second embodiment, bearings $ROUL_3$ and $ROUL_4$ may both be entirely contained in half shell $ENV_4$.

While there have been described and illustrated several specific embodiments of the invention, it is clear that variations in the details of the embodiments specifically illustrated and described may be made without departing from the true spirit and scope of the invention as defined in the appended claims.

We claim:

1. In combination, a magnetic disc cartridge, a magnetic disc memory unit having head means for transducing magnetic data of a disc of the cartridge, the memory unit having a disc drive shaft, the cartridge being selectively inserted into a receptacle of the unit, and including: a shell within which the disc is mounted, the shell having first and second end walls generally parallel to each other and faces of the disc, as well as a side wall including an opening, a door for closing the opening while the cartridge is not in the memory unit, the door being opened and the head means being inserted through the opening while the cartridge is inserted in the receptacle, means for coupling the drive shaft to the disc so the disc is turned by the drive shaft while the cartridge is inserted in the receptacle, the coupling means including: (a) a hub mounted in proximity to the first wall and having an axis of rotation at right angles to the parallel walls, the hub carrying the disc so the disc is coaxial with the axis, and (b) a drive connection for the hub extending through the second wall to the drive shaft, the second wall including an annular segment extending coaxially with the axis toward the first wall; first and second spaced bearings for the drive connection, the bearings being mounted coaxially with the axis so the disc is between them, the bearings being carried by only one of the end walls within and on opposite ends of the annular segment for precisely positioning the disc relative to the head means while the cartridge is in the receptacle and the disc is being turned by the drive shaft, the coupling means further including a drive platter mounted in the cartridge in proximity to the second wall coaxially with the axis and having an aperture engaged by a drive post of a drive disc connected to the memory unit drive shaft while the cartridge is inserted into the receptacle, the drive platter carrying the drive connection and abutting with the bearing at the end of the segment remote from the first wall, brake means in the cartridge engaging the drive platter while the cartridge is outside of the receptacle for preventing turning thereof and the disc, the brake means including a radially extending leaf spring mounted on the first wall so it has a free end engaging another aperture in the drive platter while the cartridge is outside of the disc memory unit, and means mounted on the disc memory unit for releasing said brake means while the cartridge is inserted into the receptacle, the means for releasing said brake means including another post fixedly mounted on the memory unit for engaging the leaf spring in proximity to the free end thereof to lift the free end out of the another aperture while the cartridge is in place in the receptacle.

2. The combination of claim 1 wherein the sealing mechanism comprises a ferrofluidic joint.

3. The combination of claim 1 further including means for maintaining the cartridge at a fixed position while the cartridge is inserted into the receptacle.

4. The combination of claim 3 wherein said fixed position maintaining means includes: a further aperture in the first end wall and a further post fixedly mounted on the unit, the further post engaging the further aperture while the cartridge is inserted in the receptacle.

5. The combination of claim 4 wherein said aperture engaged by the drive shaft is formed as a first radially extending slot in the drive platter, the further aperture being formed as a second radially extending slot in the first wall; said slots respectively terminating at the peripheries of the drive platter and wall and being aligned while the drive platter is braked.

6. The combination of claim 5 wherein ends of the slots in proximity to the peripheries are tapered outwardly.

7. The combination of claim 6 further including means for maintaining the cartridge at a fixed position while the cartridge is inserted into the receptacle.

8. In combination, a magnetic disc cartridge, a magnetic disc memory unit having head means for transducing magnetic data of a disc of the cartridge, the memory unit having a disc drive shaft, the cartridge being selectively inserted into a receptacle of the unit and including a shell within which the disc is mounted, the shell having first and second end walls generally parallel to each other and faces of the disc, as well as a side wall including an opening, a door for closing the opening while the cartridge is not in the memory unit, the door being opened and the head means being inserted through the opening while the cartridge is inserted in the receptacle, means for coupling the drive shaft to the disc so the disc is turned by the drive shaft while the cartridge is inserted in the receptacle, the coupling means including: (a) a hub mounted in proximity to the first wall and having an axis of rotation at right angles to the parallel walls, the hub carrying the disc so the disc is coaxial with the axis, and (b) a drive connection for the hub extending through the second wall to the drive shaft; first and second longitudinally spaced bearings for the drive connection, the bearings being mounted coaxially with the axis so the disc is between them, the bearings being carried by only one of the end walls of the shell for precisely positioning the disc relative to the head means while the cartridge is in the receptacle and the disc is being turned by the drive shaft, the coupling means further including a drive platter mounted in the cartridge in proximity to the second wall coaxially with the axis and having an aperture engaged by a drive post of a drive disc connected to the memory unit drive shaft while the cartridge is inserted in the receptacle, the drive platter carrying the drive connection and abutting with the bearing adjacent the second wall, brake means in the cartridge engaging the drive platter while the cartridge is outside of the receptacle for preventing turning thereof and the disc, the brake means including a radially extending leaf spring mounted on the first wall so it has a free end engaging another aperture in the drive platter while the cartridge is outside of the disc memory unit, and means mounted on the disc memory unit for releasing said brake means while the cartridge is inserted into the receptacle, the means for releasing said brake means including another post fixedly mounted on the memory unit for engaging the leaf spring in proximity to the free end thereof to lift the free end out of the another aperture while the cartridge is in place in the receptacle.

9. The combination of claim 8 wherein said fixed position maintaining means includes: a further aperture in the first end wall and a further post fixedly mounted on the unit, the further post engaging the further aperture while the cartridge is inserted in the receptacle.

10. The combination of claim 7 wherein said aperture engaged by the drive shaft is formed as a first radially extending slot in the drive platter, the further aperture being formed as a second radially extending slot in the first wall, said slots respectively terminating at the peripheries of the drive platter and wall and being aligned while the drive platter is braked.

11. The combination of claim 9 wherein ends of the slots in proximity to the peripheries are tapered outwardly.

12. In combination, a magnetic disc cartridge, a magnetic disc memory unit having head means for transducing magnetic data of a disc of the cartridge, the memory unit having a disc drive shaft, the cartridge being selectively inserted into a receptacle of the unit and including a shell within which the disc is mounted, the shell having first and second end walls generally parallel to each other and faces of the disc, as well as the side wall including an opening, a door for closing the opening while the cartridge is not in the memory unit, the door being opened and the head means being inserted through the opening while the cartridge is inserted into the receptacle, means for coupling the drive shaft to the disc so the disc is turned by the drive shaft while the cartridge is inserted in the receptacle, bearing means in the cartridge for precisely positioning the disc relative to the head means while the cartridge is in the receptacle and the disc is being turned by the drive shaft, the coupling means including a drive platter mounted in the cartridge in proximity to the second wall coaxially with the axis and having an aperture engaged by a drive post of a drive disc connected to the memory unit drive shaft while the cartridge is inserted in the receptacle, the drive platter carrying a drive connection for the disc and being connected to a bearing of the bearing means adjacent the second wall, brake means in the cartridge engaging the drive platter while the cartridge is outside of the receptacle for preventing turning thereof and the disc, and means mounted on the disc memory unit for releasing said brake means while the cartridge is inserted in the receptacle, the brake means including a radially extending leaf spring mounted on the second wall so it has a free end engaging another aperture in the drive platter while the cartridge is outside of the disc memory unit, the means for releasing said brake means including another post fixedly mounted on the memory unit for engaging the leaf spring in proximity to the free end thereof to lift the free end out of the another aperture while the cartridge is in place in the receptacle.

13. The combination of claim 12 further including means for maintaining the cartridge at a fixed position while the cartridge is inserted into the receptacle.

14. The combination of claim 13 wherein said fixed position maintaining means includes: a further aperture in the second end wall and a further post fixedly mounted on the unit, the further post engaging the further aperture while the cartridge is inserted in the receptacle.

15. The combination of claim 14 wherein said aperture engaged by the drive shaft is formed as a first radially extending slot in the drive platter, the further aperture being formed as a second radially extending slot in the second wall, said slots respectively terminating at the peripheries of the drive platter and wall and being aligned while the drive platter is braked.

16. The combination of claim 15 wherein ends of the slots in proximity to the peripheries are tapered outwardly.

17. A magnetic disc cartridge adapted to be selectively inserted into a receptacle of a magnetic disc memory unit having head means for transducing magnetic data of a disc of the cartridge, the memory unit having a disc drive shaft, the cartridge comprising a shell within which the disc is mounted, the shell having first and second end walls generally parallel to each other and faces of the disc, as well as a side wall including an opening, a door for closing the opening while the cartridge is not in the memory unit, the door being opened and the head means being inserted through the opening while the cartridge is inserted in the receptacle, means for coupling the drive shaft to the disc so the disc is turned by the drive shaft while the cartridge is inserted in the receptacle, bearing means for precisely positioning the disc relative to the head means while the cartridge is in the receptacle and the disc is being turned by the drive shaft, the coupling means including a drive platter mounted in proximity to the second wall coaxially with the axis, the drive platter having an aperture adapted to be engaged by a drive post of a drive disc connected to the memory drive shaft while the cartridge is inserted in the receptacle, the drive platter carrying a drive connection for the disc and being connected to a bearing of the bearing means adjacent the second wall, brake means normally engaging the drive platter for preventing turning of the drive platter and the disc, the brake means being released while the cartridge is inserted in the receptacle, the brake means including a radially extending leaf spring mounted on the first wall so it has a free end engaging another aperture in the drive platter while the cartridge is outside of the disc memory unit, the leaf spring being positioned so that the free end thereof is lifted out of the another aperture by another post fixedly mounted on the memory unit to release said brake means while the cartridge is in place in the receptacle.

18. The cartridge of claim 17 wherein the cartridge is maintained at a fixed position while the cartridge is inserted into the receptacle, said second end wall including a further aperture positioned to be engaged by a further post fixedly mounted on the unit while the cartridge is inserted in the receptacle to maintain the cartridge fixedly in place in the unit.

19. The cartridge of claim 18 wherein said aperture engaged by the drive shaft is formed as a radially extending slot in the drive platter, the further aperture being formed as a second radially extending slot in the second wall, said slots respectively terminating at the peripheries of the drive platter and wall and being aligned while the drive platter is braked.

20. In combination, a magnetic disc cartridge, a magnetic disc memory unit having head means for transducing magnetic data of a disc of the cartridge, the memory unit having a disc drive shaft, the cartridge being selectively inserted in a receptacle of the unit and including a shell within which the disc is mounted, the shell having first and second end walls generally parallel to each other and faces of the disc, as well as a side wall including an opening, a door for closing the opening while the cartridge is not in the memory unit, the door being opened and the head means being inserted through the opening while the cartridge is inserted into the receptacle, means for coupling the drive shaft to the disc so the disc is turned by the drive shaft while the cartridge is inserted in the receptacle, means for precisely positioning the disc relative to the head means while the cartridge is in the receptacle and the disc is being turned by the drive shaft, the coupling means including a drive platter mounted in the cartridge in proximity to the second wall coaxially with the axis and having an aperture engaged by a drive post of a drive disc connected to the memory unit drive shaft while the cartridge is inserted in the receptacle, the drive platter carrying the drive connection, brake means in the cartridge engging the drive platter while the cartridge is outside of the receptacle for preventing turning thereof and the disc, and means mounted on the disc memory unit for releasing said brake means while the cartridge is inserted in the receptacle, the brake means including a radially extending leaf spring mounted on the second wall so it has a free end engaging another aperture in the drive platter while the cartridge is outside of the disc memory unit, the means for releasing said brake means including another post fixedly mounted on the memory unit for engaging the leaf spring in proximity to the free end thereof to lift the free end out of the another aperture while the cartridge is in place in the receptacle.

21. A magnetic disc cartridge adapted to be selectively inserted into a receptacle of a magnetic disc memory unit having head means for transducing magnetic data of a disc of the cartridge, the memory unit having a disc drive shaft, the cartridge comprising a shell within which the disc is mounted, the shell having first and second end walls generally parallel to each other and faces of the disc, as well as a side wall including an opening, a door for closing the opening while the cartridge is not in the memory unit, the door being opened and the head means being inserted through the opening while the cartridge is inserted in the receptacle, means for coupling the drive shaft to the disc so the disc is turned by the drive shaft while the cartridge is inserted in the receptacle, the disc being precisely positioned relative to the head means while the cartridge is in the receptacle and the disc is being turned by the drive shaft, the coupling means including a drive platter mounted in proximity to the second wall coaxially with the axis and having an aperture adapted to be engaged by a drive post of a drive disc connected to the memory drive shaft while the cartridge is inserted in the receptacle, the drive platter carrying the drive connection, brake means normally engaging the drive platter for preventing turning of the drive plater and the disc, the brake means being released while the cartridge is inserted in the receptacle, the brake means including a radially extending leaf spring mounted on the second wall so it has a free end engaging another aperture in the drive platter while the cartridge is outside of the disc memory unit, the leaf spring being positioned so that the free end thereof is lifted out of the another aperture by another post fixedly mounted on the memory unit to release said brake means while the cartridge is in place in the receptacle.

22. The cartridge of claim 21 wherein the cartridge is maintained at a fixed position while the cartridge is inserted into the receptacle, said second end wall including a further aperture positioned to be engaged by a further post fixedly mounted on the unit while the cartridge is inserted in the receptacle to maintain the cartridge fixedly in place in the unit.

23. The cartridge of claim 22 wherein said aperture engaged by the drive shaft is formed as a radially extending slot in the drive platter, the further aperture being formed as a second radially extending slot in the second wall, said slots respectively terminating at the peripheries of the drive platter and wall and being aligned while the drive platter is braked.

* * * * *